United States Patent
Miyake et al.

(10) Patent No.: US 12,286,114 B2
(45) Date of Patent: Apr. 29, 2025

(54) MOTION MANAGER, VEHICLE, CONTROL METHOD FOR VEHICLE, AND NON-TRANSITORY STORAGE MEDIUM

(71) Applicant: TOYOTA JIDOSHA KABUSHIKI KAISHA, Toyota (JP)

(72) Inventors: Kazuki Miyake, Okazaki (JP); Wataru Kanda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 156 days.

(21) Appl. No.: 18/325,736

(22) Filed: May 30, 2023

(65) Prior Publication Data

US 2024/0017725 A1    Jan. 18, 2024

(30) Foreign Application Priority Data

Jul. 15, 2022    (JP) .................... 2022-113669

(51) Int. Cl.
    *B60W 30/18*     (2012.01)

(52) U.S. Cl.
    CPC ... B60W 30/18109 (2013.01); *B60W 2510/18* (2013.01)

(58) Field of Classification Search
    CPC ....... B60W 30/18109; B60W 2510/18; B60W 50/0205; B60W 2050/022; B60W 50/029; B60W 2050/0292; B60W 50/035; B60W 50/023; B60W 20/00; B60W 10/04; B60W 10/18; B60W 10/20; B60W 30/08; B60W 30/12; B60W 30/162; B60T 8/885; B60T 2270/402

See application file for complete search history.

(56) References Cited

U.S. PATENT DOCUMENTS

| | | | |
|---|---|---|---|
| 2018/0236876 A1* | 8/2018 | Isono | B60T 13/746 |
| 2020/0070849 A1 | 3/2020 | Suzuki et al. | |
| 2020/0361428 A1 | 11/2020 | Blumentritt et al. | |
| 2022/0266819 A1 | 8/2022 | Itoh et al. | |
| 2024/0101079 A1* | 3/2024 | Yuan | B60T 8/885 |

FOREIGN PATENT DOCUMENTS

| | | |
|---|---|---|
| EP | 3875329 A1 | 9/2021 |
| JP | 2020-032894 A | 3/2020 |
| JP | 2022-127419 A | 8/2022 |
| WO | 2019/068570 A1 | 4/2019 |

* cited by examiner

*Primary Examiner* — Sizo B Vilakazi
(74) *Attorney, Agent, or Firm* — Oliff PLC (57) ABSTRACT

A motion manager is configured to request at least one of a plurality of actuators provided in a vehicle to move the vehicle in accordance with a kinematic plan. The actuators includes a second holding device having the holding function and being configured to execute backup control. The motion manager includes one or more processors configured to: receive information indicating the kinematic plan from a setting device; distribute, to at least one of the actuators, a motion request for the vehicle calculated by using the kinematic plan; and transmit, to the setting device, predetermined information including information indicating whether an abnormality has occurred in the holding function of the second holding device and information indicating a control status of the second holding device, and not including information for identifying a category of the second holding device.

5 Claims, 6 Drawing Sheets

MOTION MANAGER, VEHICLE, CONTROL METHOD FOR VEHICLE, AND NON-TRANSITORY STORAGE MEDIUM

CROSS-REFERENCE TO RELATED APPLICATION

This application claims priority to Japanese Patent Application No. 2022-113669 filed on Jul. 15, 2022, incorporated herein by reference in its entirety.

BACKGROUND

1. Technical Field

The present disclosure relates to a motion manager, a vehicle, a control method for a vehicle, and a non-transitory storage medium.

2. Description of Related Art

There is, as the related art, a vehicle including a plurality of applications that sets and requests kinematic plans related to vehicle driver assistance, a motion manager that integrates a plurality of kinematic plans from the applications and sets a motion request based on the integrated kinematic plans, and an actuator system that realizes the set motion request. Such a vehicle includes a holding device that holds a stopped state of the vehicle.

For example, Japanese Unexamined Patent Application Publication No. 2020-032894 (JP 2020-032894 A) discloses an information processing device that can easily perform an arbitration process on drive requests output from vehicle driver assistance applications. It is disclosed that this vehicle has a holding function such as brake hold control for maintaining a braking state with brakes after the vehicle has stopped.

SUMMARY

For example, when the above vehicle is stopped by a service brake as a part of the driver assistance, a holding device other than the service brake may be used as a backup for holding the stopped state of the vehicle in preparation for an abnormality in the service brake. As the holding device to be used as the backup for holding the stopped state, there is a plurality of categories of holding device such as an electric parking brake and a parking lock system. Therefore, driver assistance applications may be required to acquire information such as a control status of the holding device used as the backup and whether failure has occurred.

When the motion manager transmits information on the holding device to be used as the backup to the applications, however, the motion manager is required to set the information to be transmitted for each category of holding device to be used as the backup, thereby causing a design burden such as time and cost for presetting the information.

The present disclosure provides a motion manager, a vehicle, a control method for a vehicle, and a non-transitory storage medium that reduce the occurrence of a design burden due to an increase in the number of categories of holding device to be used as a backup for holding the stop of the vehicle.

A motion manager according to a first aspect of the present disclosure is a motion manager configured to request at least one of a plurality of actuators provided in a vehicle to move the vehicle in accordance with a kinematic plan related to driver assistance for the vehicle. The driver assistance includes assistance using a holding function to hold a stopped state of the vehicle. The kinematic plan is set by a setting device configured to transmit information to and receive information from the motion manager. The actuators include a first holding device having the holding function, and a second holding device having the holding function and being configured to execute backup control for holding the stopped state of the vehicle when the first holding device has an abnormality. The motion manager includes one or more processors configured to: receive information indicating the kinematic plan from the setting device; distribute, to at least one of the actuators, a motion request for the vehicle that is calculated by using the kinematic plan; and transmit predetermined information to the setting device. The predetermined information includes first information indicating whether an abnormality has occurred in the holding function of the second holding device, and second information indicating a control status of the second holding device, and the predetermined information does not include information for identifying a category of the second holding device.

With this configuration, the predetermined information transmitted to the setting device includes the first information and the second information, and does not include the information for identifying the category of the second holding device. Therefore, the setting device can grasp the control status and whether the second holding device has an abnormality based on the first information and the second information even if the category of the second holding device is different. Therefore, when there are variations in the second holding device, it is not necessary to set the predetermined information depending on the category of the second holding device. Thus, it is possible to reduce the occurrence of the design burden due to the increase in the number of categories of second holding device.

In the above aspect, the first holding device may include a service brake. The second holding device may include a parking lock system or an electric parking brake system.

With this configuration, the predetermined information transmitted to the setting device includes the first information and the second information, and does not include the information for identifying the category of the second holding device. Therefore, the setting device can grasp the control status and whether the second holding device has an abnormality based on the first information and the second information even if the category of the second holding device is different.

A vehicle according to a second aspect of the present disclosure includes a setting device configured to set a kinematic plan related to driver assistance for the vehicle, a plurality of actuators including a first holding device and a second holding device, and a motion manager configured to transmit information to and receive information from the setting device, and request at least one of the actuators to move the vehicle in accordance with the kinematic plan. The first holding device has a holding function to hold a stopped state of the vehicle. The second holding device has the holding function and is configured to execute backup control for holding the stopped state of the vehicle when the first holding device has an abnormality. The driver assistance includes assistance using the holding function. The motion manager is configured to transmit predetermined information to the setting device. The predetermined information includes first information indicating whether an abnormality has occurred in the holding function of the second holding device, and second information indicating a control status of the second holding device, and the predetermined information does not include information for identifying a category of the second holding device.

A control method for a vehicle according to a third aspect of the present disclosure is performed by a computer mounted on the vehicle. The vehicle includes a setting device configured to set a kinematic plan related to driver assistance for the vehicle, and a plurality of actuators including a first holding device and a second holding device. The first holding device has a holding function to hold a stopped state of the vehicle. The second holding device has the holding function and is configured to execute backup control for holding the stopped state of the vehicle when the first holding device has an abnormality. The driver assistance includes assistance using the holding function. The control method includes setting a kinematic plan related to the driver assistance by using the setting device, receiving information indicating the kinematic plan from the setting device, distributing, to at least one of the actuators, a motion request for the vehicle that is calculated by using the kinematic plan, and transmitting predetermined information to the setting device. The predetermined information includes first information indicating whether an abnormality has occurred in the holding function of the second holding device, and second information indicating a control status of the second holding device, and the predetermined information does not include information for identifying a category of the second holding device.

A non-transitory storage medium according to a fourth aspect of the present disclosure stores instructions that are executable by a computer mounted on a vehicle and that cause the computer to perform the control method according to the third aspect.

According to the present disclosure, it is possible to provide the motion manager, the vehicle, the control method for the vehicle, and the non-transitory storage medium that reduce the occurrence of the design burden due to the increase in the number of categories of holding device to be used as the backup for holding the stop of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. The same or corresponding parts are denoted by the same signs throughout the drawings, and description thereof will not be repeated.

Figure 1:
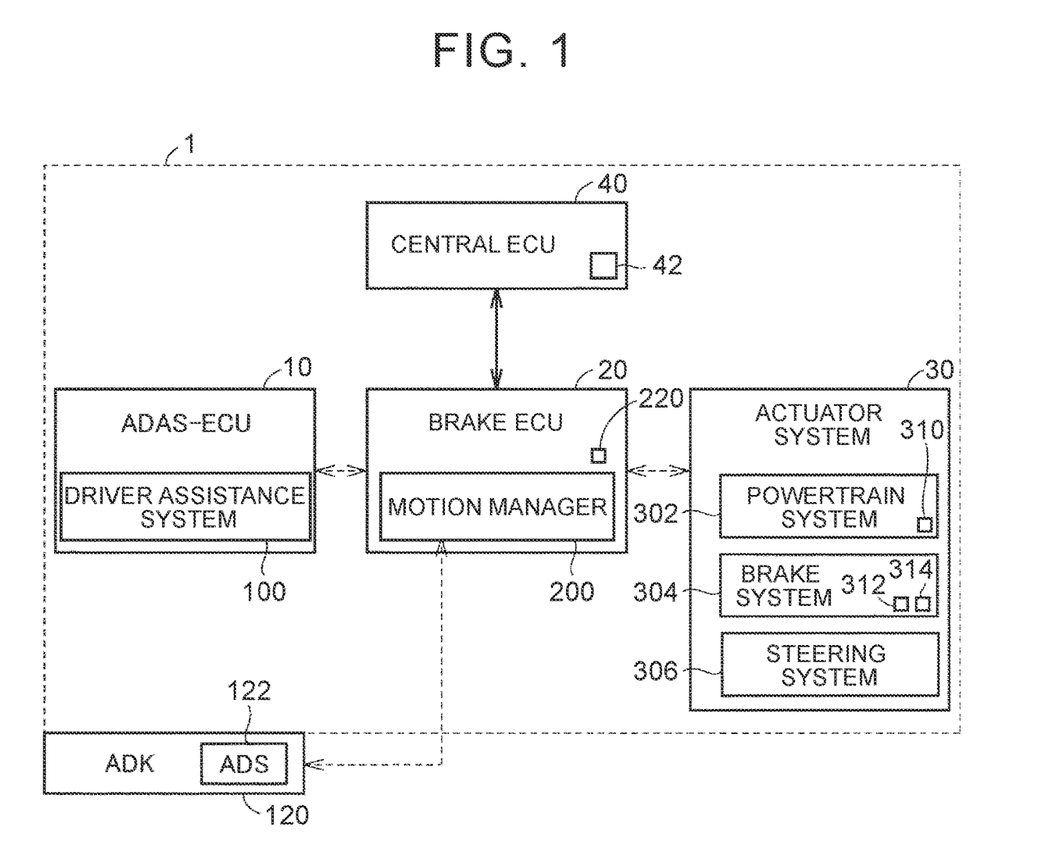
FIG. 1 is a diagram showing an example of a configuration of a vehicle.

FIG. 1 is a diagram showing an example of a configuration of a vehicle 1. As shown in FIG. 1, the vehicle 1 includes an advanced driver assistance system (ADAS)-electronic control unit (ECU) 10, a brake ECU 20, an actuator system 30, a central ECU 40, and an autonomous driving kit (ADK) 120 that is an autonomous driving device.

The vehicle 1 may be any vehicle having a configuration capable of implementing functions of a driver assistance system described later. Examples of the vehicle 1 include a vehicle including an engine as a driving source, a battery electric vehicle including an electric motor as a driving source, and a hybrid electric vehicle including an engine and an electric motor and using at least one of the engine and the electric motor as a driving source.

Each of the ADAS-ECU 10, the brake ECU 20, the central ECU 40, and the ADK 120 is a computer including a processor such as a central processing unit (CPU) that executes a program, a memory, and an input/output interface.

The ADAS-ECU 10 includes a driver assistance system 100 having functions related to driver assistance of the vehicle 1. The driver assistance system 100 implements various functions to assist in driving of the vehicle 1 including at least one of steering control, drive control, and braking control on the vehicle 1 by executing installed applications. Examples of the applications installed in the driver assistance system 100 include applications that implement functions of an automated parking system, and applications that implement functions of an advanced driver assistance system (ADAS) (hereinafter referred to as "ADAS applications").

For example, the ADAS applications include at least one of an application that implements functions of follow-up traveling (adaptive cruise control (ACC), etc.) for keeping a constant vehicle-to-vehicle distance from a preceding vehicle, an application that implements functions of an auto-speed limiter (ASL) for keeping an upper limit of a vehicle speed by recognizing a vehicle speed limit, an application that implements functions of lane keeping assistance (lane keeping assist (LKA), lane tracing assist (LTA), etc.) for keeping a traveling lane, an application that implements functions of collision damage reducing braking (autonomous emergency braking (AEB), pre-crash safety (PCS), etc.) for automatically applying a brake to reduce damage in a collision, an application that implements functions of lane deviation warning (lane departure warning (LDW), lane departure alert (LDA), etc.) for warning a driver about deviation from a traveling lane of the vehicle 1, and an application that implements functions of intelligent speed assistance (ISA) for controlling the vehicle speed so as not to exceed a speed limit.

Each application in the driver assistance system 100 outputs, to the brake ECU 20 (more specifically, a motion manager 200), a request for a kinematic plan that guarantees commerciality (function) of the application alone based on, for example, information on vehicle surroundings acquired (input) from a plurality of sensors (not shown) and a driver's assistance request. Examples of the sensors include a vision sensor such as a forward camera, a radar, a light detection and ranging (LiDAR) sensor, and a position detection device.

The forward camera is disposed, for example, on the back of a rear-view mirror in a vehicle cabin, and is used to capture an image of a view ahead of the vehicle. The radar is a distance measuring device that irradiates an object with a radio wave having a short wavelength, detects the radio wave returned from the object, and measures a distance and a direction to the object. The LiDAR sensor is a distance measuring device that radiates a pulsed laser beam (light such as infrared rays) and measures a distance based on a period that passes until the laser beam returns after being reflected by an object. Examples of the position detection device include a global positioning system (GPS) receiver that detects a position of the vehicle 1 by using information received from a plurality of satellites orbiting the earth.

Each application acquires, as recognized sensor information, information on vehicle surroundings obtained by integrating detection results from one or more sensors, and also acquires an assistance request from the driver via a user interface (not shown) such as a switch. For example, each application can recognize other vehicles, obstacles, or persons around the vehicle by processing, using artificial intelligence (AI) or an image processor, images or videos of vehicle surroundings acquired by the sensors.

The applications installed in the driver assistance system 100 are not particularly limited to the applications described above, and an application that implements other functions may be added or any existing application may be omitted. The number of installed applications is not particularly limited.

In the present embodiment, the ADAS-ECU 10 has been described as including the driver assistance system 100 constituted by the plurality of applications. For example, an ECU may be provided for each application instead. For example, the driver assistance system 100 may be constituted by an ECU including an application that implements the functions of the automated parking system and an ECU including the ADAS application.

The kinematic plan includes, for example, a request related to a longitudinal acceleration or deceleration to be generated in the vehicle 1, a request related to a steering angle of the vehicle 1, and a request related to stop holding of the vehicle 1.

Examples of the request related to the longitudinal acceleration or deceleration to be generated in the vehicle 1 include an operation request for a powertrain system 302, and an operation request for a brake system 304.

The ADK 120 includes an autonomous driving system (ADS) 122. The ADK 120 is attachable to and detachable from the vehicle 1 and is replaceable with another ADK. The ADS 122 has applications that implement functions of autonomous driving. The ADS 122 outputs, to the brake ECU 20, a request for a kinematic plan (that is, a kinematic plan for autonomous driving) that guarantees commerciality (function) of the application alone based on, for example, information on vehicle surroundings acquired from a plurality of sensors mounted on the ADK 120 and from the vehicle 1. Examples of the sensors mounted on the ADK 120 include a vision sensor such as a forward camera, a radar, a light detection and ranging (LiDAR) sensor, and a position detection device. Since the sensors are described above, detailed description thereof will not be repeated. For example, the autonomous driving is performed by performing at least one of acceleration, deceleration, steering, and stopping of the vehicle 1 depending on the surrounding conditions of the vehicle 1 without driver's operations in a section from a current location to a preset destination or in a part of the section. In the present embodiment, the ADK 120 is configured to acquire the surrounding conditions of the vehicle 1 by a sensor or an image processing device in a system different from the driver assistance system 100.

The applications that implement the functions of autonomous driving may be, for example, included in the driver assistance system 100 or installed in an ECU different from the ADAS-ECU 10.

The brake ECU 20 includes the motion manager 200. In the present embodiment, description will be given of an exemplary case where the brake ECU 20 has a hardware configuration including the motion manager 200. The motion manager 200 may be provided as a single ECU different from the brake ECU 20 or included in another ECU different from the brake ECU 20. The motion manager 200 includes, for example, one or more processors. The brake ECU 20 is configured to communicate with each of the ADAS-ECU 10, various ECUs included in the actuator system 30, the central ECU 40, and the ADK 120.

The motion manager 200 requests the actuator system 30 to move the vehicle 1 in accordance with a kinematic plan set by at least one of the applications in the driver assistance system 100 and the applications that implement the functions of autonomous driving in the ADS 122. The detailed configuration of the motion manager 200 will be described later.

The actuator system 30 realizes a motion request for the vehicle 1 that is output from the motion manager 200. The actuator system 30 includes a plurality of actuators. FIG. 1 shows a case where the actuator system 30 includes, for example, the powertrain system 302, the brake system 304, and a steering system 306 as the actuators. The number of actuators to which the motion manager 200 gives requests is not limited to three as described above, and may be four or more, or may be two or less.

The powertrain system 302 includes a powertrain capable of generating a driving force on driving wheels of the vehicle 1, and an ECU that controls an operation of the powertrain (both not shown). For example, the powertrain includes at least one of an internal combustion engine such as a gasoline engine or a diesel engine, a transmission including a gearbox and a differential, a motor generator serving as a driving source, a power storage device that stores electric power to be supplied to the motor generator, a power conversion device that mutually converts electric power between the motor generator and the power storage device, and a power generation source such as a fuel cell. The ECU that controls the operation of the powertrain controls devices associated with the powertrain system 302 to realize a motion request from the motion manager 200 on the associated devices.

The powertrain system 302 includes a parking lock system (hereinafter referred to as "P-lock system") 310.

The P-lock system 310 restricts or releases the restriction on rotation of an output shaft of the transmission by an operation of a shift actuator. In the P-lock system 310, for example, a protrusion at the tip of a parking lock pawl whose position is adjusted by the shift actuator is fitted to teeth of a gear (lock gear) coupled to a rotating element in the transmission of the vehicle 1. Thus, the rotation of the output shaft of the transmission is restricted, and the rotation of the driving wheels is restricted, thereby holding a stopped state of the vehicle 1. For example, the P-lock system 310 separates the protrusion fitted between the teeth by the shift actuator. Thus, the restriction on the rotation of the output shaft of the transmission is released, and the restriction on the rotation of the driving wheels is released.

The brake system 304 includes, for example, a plurality of braking devices 312 provided on the wheels of the vehicle 1. Examples of the braking device 312 include a service brake including a hydraulic brake such as a disc brake that uses a hydraulic pressure to generate a braking force. The braking device 312 decelerates the traveling vehicle 1. The braking device 312 holds the stopped state of the vehicle 1 by restricting the rotation of the wheels when the hydraulic pressure is increased by using an actuator (not shown) in the stopped state of the vehicle 1. The braking devices 312 correspond to a first holding device. The braking device 312 releases the restriction on the rotation of the wheels, for example, when the hydraulic pressure is reduced by using the actuator in the stopped state of the vehicle 1.

Examples of the braking device 312 also include a motor generator connected to a wheel to generate a regenerative torque. The braking operation of the vehicle 1 using the braking devices 312 is controlled by the brake ECU 20. The brake ECU includes, for example, a control unit (not shown) for controlling the brake system 304 separately from the motion manager 200.

The brake system 304 further includes an electric parking brake system (hereinafter referred to as "EPB") 314.

For example, the EPB 314 restricts the rotation of the wheels of the vehicle 1 by an operation of an actuator of the EPB 314. The EPB 314 may restrict the rotation of the wheels by, for example, operating a parking brake provided on a part of the wheels of the vehicle 1 by using the actuator. In this case, the EPB 314 releases the restriction on the rotation of the wheels of the vehicle 1, for example, by an operation of the actuator of the EPB 314. The brake ECU 20 further includes an EPB control unit 212. The EPB control unit 212 is configured to control the actuator of the EPB 314.

The steering system 306 includes, for example, a steering device capable of changing a steering angle of steered wheels (for example, front wheels) of the vehicle 1, and an ECU that controls an operation of the steering device (both not shown). The steering device includes, for example, a steering wheel that changes the steering angle based on an operation amount, and an electric power steering system (EPS) capable of adjusting the steering angle by using an actuator separately from the operation of the steering wheel. The ECU that controls the operation of the steering device controls the operation of the actuator of the EPS.

The central ECU 40 includes a memory 42 capable of updating stored contents. The central ECU 40 is, for example, configured to communicate with the brake ECU 20, and communicate with a device (for example, a server) (not shown) outside the vehicle 1 via a communication module (not shown). When update information is received from the server outside the vehicle 1, the central ECU 40 updates information stored in the memory 42 by using the received update information. Predetermined information is stored in the memory 42. The predetermined information includes, for example, information to be read from various ECUs when the system of the vehicle 1 is started.

In the present embodiment, description has been given of the central ECU configured such that the predetermined information is read from various ECUs when the system of the vehicle 1 is started, but the central ECU 40 may have, for example, a function of relaying communication between various ECUs (gateway function).

Figure 2:
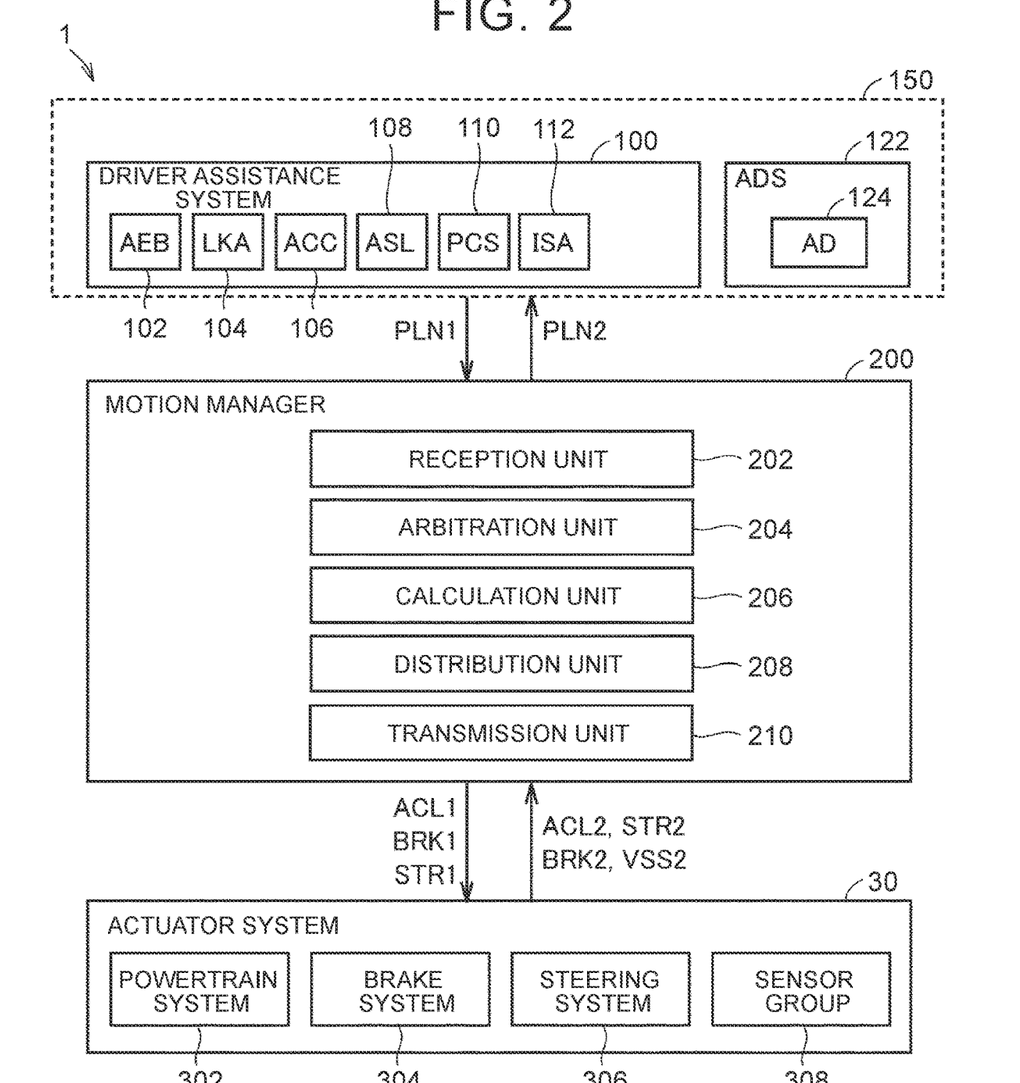
FIG. 2 is a diagram illustrating an example of an operation of a motion manager.

An example of the operation of the motion manager 200 will be described in detail below with reference to FIG. 2. FIG. 2 is a diagram illustrating an example of the operation of the motion manager 200.

FIG. 2 shows a system group 150 including the driver assistance system 100 and the ADS 122. FIG. 2 shows an exemplary case where the driver assistance system 100 includes AEB 102, LKA 104, ACC 106, ASL 108, PCS 110, and ISA 112 as applications. FIG. 2 shows a case where the ADS 122 includes, for example, AD 124 that is an application for implementing the autonomous driving (AD) function. A request for a kinematic plan set in at least one of the applications is transmitted from the system group 150 including the driver assistance system 100 and the ADS 122 to the motion manager 200 as a request signal PLN1.

The request signal PLN1 includes, for example, information on a target acceleration set as one of the kinematic plans in the ACC, the AEB, the ASL, the PCS, the ISA, or the AD, or information on a target curvature set as one of the kinematic plans in the LKA or the AD.

The motion manager 200 sets a motion requested in the vehicle 1 based on the request for the kinematic plan in the received request signal PLN1, and requests the actuator system 30 to realize the set motion. That is, the motion manager 200 transmits, to the actuator system 30, a request signal ACL1 indicating a request for an operation on the powertrain system 302. The motion manager 200 transmits, to the actuator system 30, a request signal BRK1 indicating a request for an operation on the brake system 304. The motion manager 200 transmits, to the actuator system 30, a request signal STR1 indicating a request for an operation on the steering system 306.

The request signal ACL1 includes, for example, information on a requested value of a driving torque or driving force, and information on a method for arbitration (for example, whether to select a maximum value or a minimum value, change the value stepwise, or change the value gradually).

The request signal BRK1 includes, for example, information on a requested value of a braking torque, information on a method for arbitration (for example, whether to change the value stepwise or change the value gradually), and information on a braking execution timing (whether to execute braking immediately).

The request signal STR1 includes, for example, information on a target steering angle, information on whether the target steering angle is effective, and information on upper and lower limit torques of an assist torque for a steering wheel operation.

An actuator that has received a corresponding request signal among the actuators constituting the actuator system 30 is controlled to realize the operation request in the request signal.

An example of the configuration of the motion manager 200 will be described below. As shown in FIG. 2, the motion manager 200 includes a reception unit 202, an arbitration unit 204, a calculation unit 206, a distribution unit 208, and a transmission unit 210.

The reception unit 202 receives a kinematic plan request output by one or more applications in the system group 150. Details of the kinematic plan in the present embodiment will be described later.

The arbitration unit 204 arbitrates a plurality of kinematic plan requests received from the respective applications via the reception unit 202. Examples of a process of the arbitration include a process of selecting one kinematic plan from among the kinematic plans based on a predetermined selection criterion. As another example of the process of the arbitration, a new kinematic plan may be set based on the kinematic plans. The arbitration unit 204 may arbitrate the kinematic plan requests by further adding predetermined information received from the actuator system 30. The arbitration unit 204 may determine whether to temporarily give priority to a motion of the vehicle 1 that is requested based on a driver's status and a vehicle status over a motion of the vehicle 1 that is associated with the kinematic plan determined based on the arbitration result.

The calculation unit 206 calculates a motion request based on a result of the arbitration of the kinematic plan requests in the arbitration unit 204 and a motion of the vehicle 1 that is determined based on the arbitration result. This motion request is a physical quantity for controlling at least one of the actuators in the actuator system 30, and includes a physical quantity different from the physical quantity of the kinematic plan request. For example, when the kinematic plan request (first request) is a longitudinal acceleration, the calculation unit 206 calculates, as the motion request (second request), a value obtained by converting the acceleration into a driving force or a driving torque.

The distribution unit 208 distributes the motion request calculated by the calculation unit 206 to at least one actuator in the actuator system 30. For example, when acceleration of the vehicle 1 is requested, the distribution unit 208 distributes the motion request only to the powertrain system 302. Alternatively, when deceleration of the vehicle 1 is requested, the distribution unit 208 appropriately distributes the motion request to the powertrain system 302 and the brake system 304 to realize a target deceleration.

Information on the state of the powertrain system 302 in the actuator system 30 is transmitted from the powertrain system 302 to the motion manager 200 as a signal ACL2. The information on the state of the powertrain system 302 includes, for example, information on an operation on an accelerator pedal, information on an actual driving torque or an actual driving force of the powertrain system 302, actual shift range information, information on upper and lower limits of the driving torque, information on upper and lower limits of the driving force, and information on the reliability of the powertrain system 302. The information on the state of the powertrain system 302 further includes, for example, information on the P-lock system 310 in addition to the above information.

Information on the state of the brake system 304 in the actuator system 30 is transmitted from the brake system 304 to the motion manager 200 as a signal BRK2. The information on the state of the brake system 304 includes, for example, information on an operation on a brake pedal, information on a braking torque requested by the driver, information on a requested value of the braking torque after arbitration, information on an actual braking torque after the arbitration, and information on the reliability of the brake system 304. The information on the state of the brake system 304 further includes information on the braking devices 312 and information on the EPB 314 in addition to the above information.

Information on the state of the steering system 306 in the actuator system 30 is transmitted from the steering system 306 to the motion manager 200 as a signal STR2. The information on the state of the steering system 306 includes, for example, information on the reliability of the steering system 306, information on whether the driver is holding the steering wheel, information on a torque for operating the steering wheel, and information on a rotation angle of the steering wheel.

The actuator system 30 also includes a sensor group 308 in addition to the powertrain system 302, the brake system 304, and the steering system 306.

The sensor group 308 includes a plurality of sensors that detects behavior of the vehicle 1. The sensor group 308 includes, for example, a longitudinal gravitational force sensor that detects a longitudinal vehicle body acceleration of the vehicle 1, a lateral gravitational force sensor that detects a lateral vehicle body acceleration of the vehicle 1, a wheel velocity sensor that is provided on each wheel and detects a wheel velocity, and a yaw rate sensor that detects an angular velocity of a rotation angle in a yaw direction (yaw angle). The sensor group 308 transmits information including detection results from the sensors to the motion manager 200 as a signal VSS2. That is, the signal VSS2 includes, for example, a detection value of the longitudinal gravitational force sensor, a detection value of the lateral gravitational force sensor, a detection value of the wheel velocity sensor of each wheel, a detection value of the yaw rate sensor, and information on the reliability of each sensor. The sensor group 308 further includes, for example, a sensor for detecting an operation amount of the shift actuator, and a sensor for detecting an operation amount of the actuator of the EPB 314. That is, the signal VSS2 further includes, for example, a detection value of the operation amount of the shift actuator and a detection value of the operation amount of the actuator of the EPB 314.

When various signals are received from the actuator system 30, the transmission unit 210 transmits predetermined information to the driver assistance system 100 as a signal PLN2.

The configurations of the devices mounted on the vehicle 1 and the configuration of the motion manager 200 are illustrative, and any component may be added, replaced, changed, or omitted as appropriate. The functions of each device can be executed by integration of the functions into one device or distribution of the functions between or among a plurality of devices as appropriate.

In the vehicle 1 having the configuration described above, for example, when the braking devices 312 are used to hold the stopped state as a part of driver assistance, a holding device other than the braking devices 312 may be used as a backup for holding the stopped state of the vehicle 1 in preparation for an abnormality in the braking devices 312. The holding device to be used as the backup for holding the stopped state (that is, holding the stopped state when any braking device 312 has an abnormality) is, for example, any one of a plurality of categories of holding device such as the P-lock system 310 and the EPB 314. Therefore, the driver assistance applications may be required to acquire information such as a control status of the holding device used as the backup and whether failure has occurred.

When the motion manager 200 transmits information on the holding device to be used as the backup to any application in the ADAS-ECU 10, however, the motion manager 200 may be required to set the information to be transmitted for each category of holding device to be used as the backup. As a result, a design burden such as time and cost for presetting the information may occur.

Figure 3:
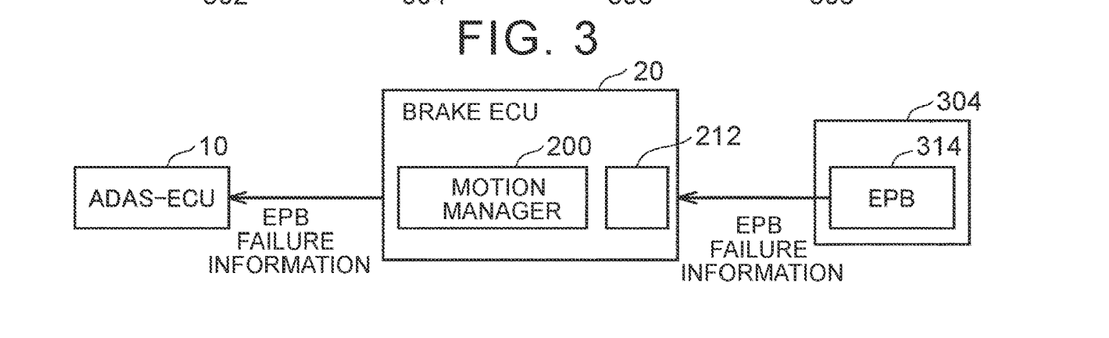
FIG. 3 is a diagram illustrating failure information when an electric parking brake (EPB) is used as a backup for holding a stop of the vehicle.
Figure 4:
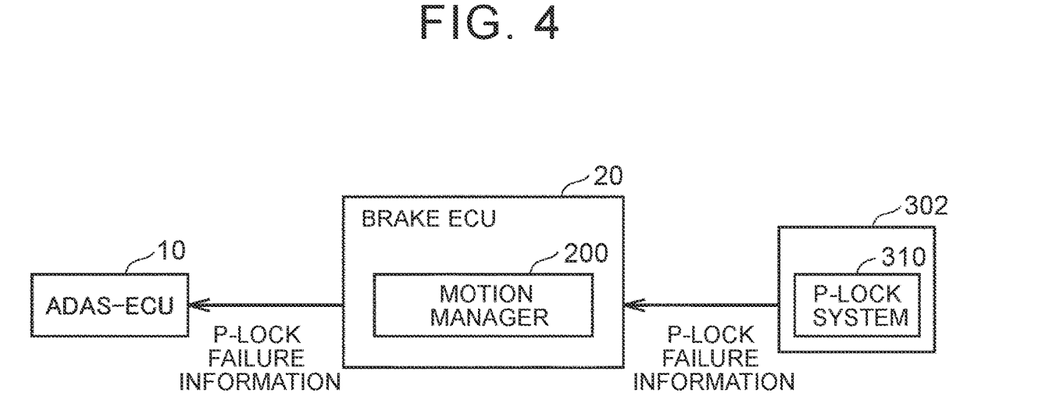
FIG. 4 is a diagram illustrating failure information when a parking lock (P-lock) system is used as the backup for holding the stop of the vehicle.

FIG. 3 is a diagram illustrating failure information when the EPB 314 is used as the backup for holding the stop of the vehicle 1. FIG. 4 is a diagram illustrating failure information when the P-lock system 310 is used as the backup for holding the stop of the vehicle 1.

For example, when the stopped state of the vehicle 1 is held by using the braking devices 312, any application in the ADAS-ECU 10 is required to acquire an operation status of the EPB 314 so that backup control for holding the stopped state of the vehicle 1 can be executed in the event of an abnormality in the braking devices 312. In this case, the motion manager 200 acquires the control status and failure information of the EPB 314 from the EPB 314 and transmits the acquired information to the application of the transmission destination. Thus, the application of the transmission destination can acquire the operation status of the EPB 314.

In a vehicle on which the EPB 314 is not mounted, when the stopped state of the vehicle 1 is held by using the braking devices 312, it is necessary to acquire the operation status of the P-lock system 310 so that the backup control can be executed. In this case, the motion manager 200 acquires the control status and failure information of the P-lock system 310 from the P-lock system 310 and transmits the acquired information to the application of the transmission destination. Thus, the application of the transmission destination can acquire the operation status of the P-lock system 310.

When the motion manager 200 generates different pieces of failure information depending on whether the backup holding device is the EPB 314 or the P-lock system 310 and transmits it to the application of the transmission destination, however, the motion manager 200 may be required to set the control information and the failure information depending on the category of the backup holding device. That is, the motion manager 200 may have a design burden such as time and cost for setting the control information and the failure information for each category of holding device to be used as the backup every time the holding device differs depending on the category or grade of the vehicle.

In the present embodiment, the transmission unit 210 of the motion manager 200 transmits predetermined information to the ADAS-ECU 10 including the application that sets a kinematic plan. The predetermined information includes first information indicating whether an abnormality has occurred in the holding function of the holding device to be used as the backup, and second information indicating the control status of the holding device, and does not include information for identifying the category of the holding device to be used as the backup.

In this way, the ADAS-ECU 10 can grasp the control status and whether the holding device to be used as the backup has an abnormality based on the first information and the second information even if the category of the holding device is different. Therefore, when there are variations in the holding device to be used as the backup, it is not necessary to set the control information and the failure information depending on the category of the holding device. Thus, it is possible to reduce the occurrence of the design burden due to the increase in the number of categories of holding device to be used as the backup.

Figure 5:
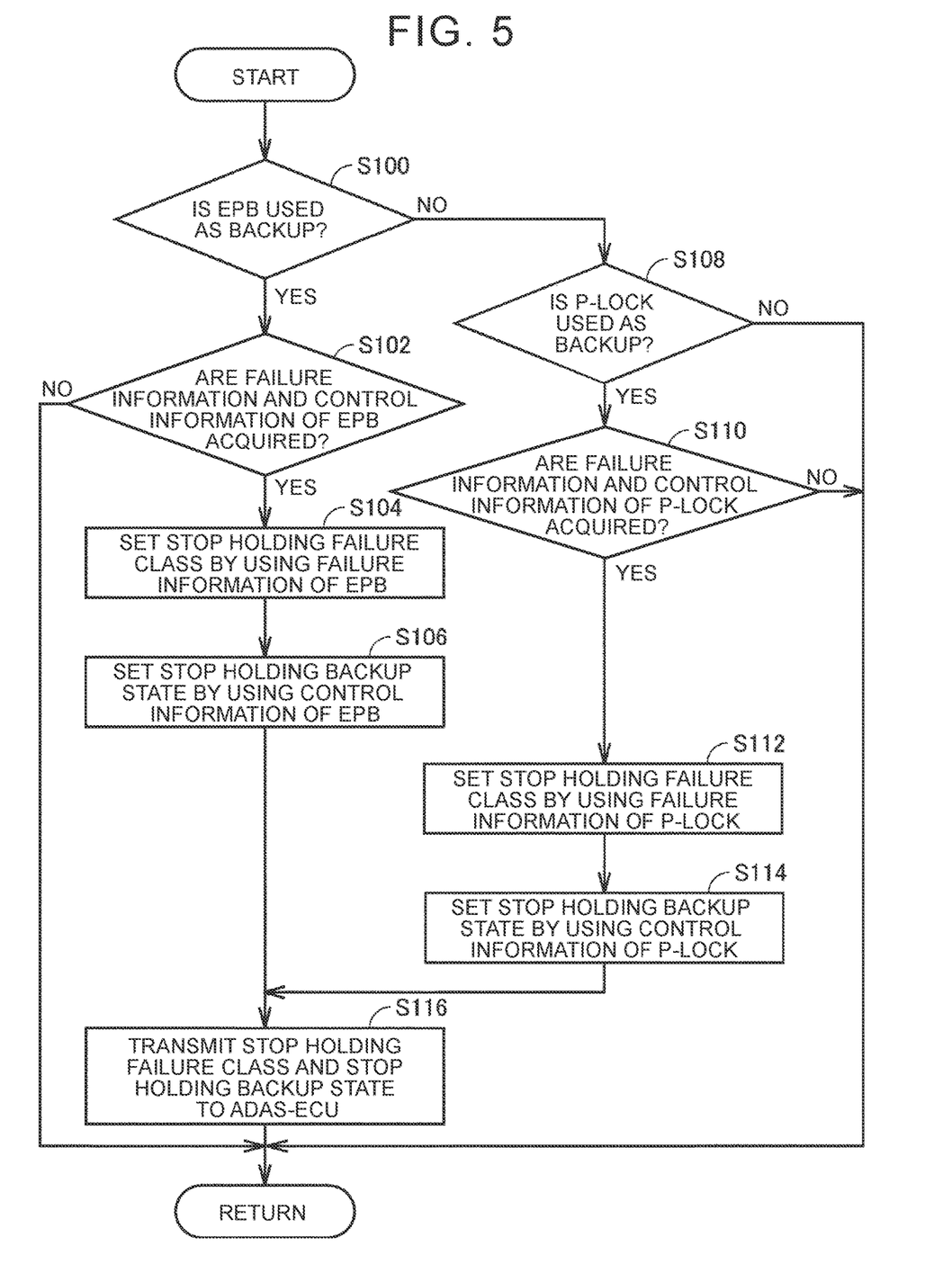
FIG. 5 is a flowchart showing an example of a process to be executed in the motion manager.

An example of a process to be executed in the motion manager 200 will be described below with reference to FIG. 5. FIG. 5 is a flowchart showing an example of the process to be executed in the motion manager 200. A series of processes shown in this flowchart is repeatedly executed by the motion manager 200 at predetermined control cycles.

In Step (hereinafter referred to as "S") 100, the motion manager 200 determines whether to use the EPB 314 as the backup when the braking devices 312 are used to hold the stopped state of the vehicle 1. The motion manager 200 determines, for example, whether the EPB 314 is a control target as the backup based on whether a predetermined first control target flag is ON. The first control target flag is set to ON, for example, when the EPB 314 is mounted on the vehicle 1 (when the EPB 314 is included as the control target). The motion manager 200 may determine, for example, that the EPB 314 is the control target as the backup when the first control target flag is ON. When determination is made to use the EPB 314 as the backup (YES in S100), the process proceeds to S102.

In S102, the motion manager 200 determines whether failure information and control information of the EPB 314 are acquired.

The EPB control unit 212 determines whether the EPB 314 has failed when a predetermined execution condition is satisfied. The predetermined execution condition may include, for example, a condition that a predetermined period has elapsed since the previous failure determination, or a condition that the vehicle has traveled a predetermined distance since the previous failure determination. Alternatively, the predetermined execution condition may include a condition that the control information described later has been acquired.

When the EPB control unit 212 determines that the EPB 314 has failed, the EPB control unit 212 transmits information indicating the failure to the motion manager 200 as the failure information. The failure information may include information indicating a failed part of the EPB 314. When the EPB control unit 212 determines that the EPB 314 has no failure, the EPB control unit 212 transmits information indicating no failure to the motion manager 200 as the failure information.

The EPB control unit 212 transmits information indicating the control status of the EPB 314 to the motion manager 200 as the control information. For example, when the EPB 314 holds the stopped state of the vehicle 1, the EPB control unit 212 transmits information indicating that the vehicle 1 is holding the stopped state by the operation of the EPB 314 to the motion manager 200 as the control information. When the stopped state of the vehicle 1 held by the EPB 314 is terminated, the EPB control unit 212 transmits information indicating that the stopped state of the vehicle 1 held by the EPB 314 is terminated to the motion manager 200 as the control information.

The motion manager 200 determines whether the failure information and the control information of the EPB 314 are acquired. The motion manager 200 determines that the failure information and the control information of the EPB 314 are acquired when the failure information and the control information have been acquired from the EPB control unit 212. When determination is made that the failure information and the control information of the EPB 314 are acquired (YES in S102), the process proceeds to S104.

In S104, the motion manager 200 sets a stop holding failure class by using the failure information and the control information of the EPB 314. For example, the motion manager 200 sets any one of a plurality of predetermined values "00", "01", and "11" as the stop holding failure class. The predetermined value "00" is, for example, a value indicating that there is no abnormality in the holding device to be used as the backup. The predetermined value "01" is a value indicating that the holding device to be used as the backup is temporarily unavailable.

For example, the motion manager 200 sets the predetermined value "01" as the stop holding failure class when an abnormality has occurred in the EPB 314 but failure has not been determined (when a self-diagnosis function has not output a value indicating that the EPB 314 has an abnormality). For example, the motion manager 200 may set the predetermined value "01" as the stop holding failure class when the number of times determination is made that the EPB 314 has an abnormality is equal to or smaller than a threshold value. The predetermined value "11" is a value indicating that the holding device to be used as the backup is unavailable. For example, the motion manager 200 sets the predetermined value "11" as the stop holding failure class when failure in the EPB 314 has been determined (when the self-diagnosis function has output the value indicating that the EPB 314 has an abnormality). For example, the motion manager 200 may set the predetermined value "11" as the stop holding failure class when the number of times the EPB 314 has an abnormality is larger than the threshold value. When determination is made not to use the EPB 314 as the backup (NO in S100), the process proceeds to S108.

In S106, the motion manager 200 sets a stop holding backup state by using the control information of the EPB. For example, the motion manager 200 sets any one of a plurality of predetermined values "00", "01", "10", and "11" as the stop holding backup state. The predetermined value "00" is, for example, a value indicating that the stopped state of the vehicle 1 is not held by the holding device to be used as the backup. The predetermined value "01" is, for example, a value indicating that the holding device to be used as the backup is currently controlled to hold the stopped state of the vehicle 1 from the state in which it does not hold the stopped state of the vehicle 1. The predetermined value "10" is, for example, a value indicating that the holding device to be used as the backup is currently controlled not to hold the stopped state of the vehicle 1 from the state in which it holds the stopped state of the vehicle 1. The predetermined value "11" is, for example, a value indicating that the stopped state of the vehicle 1 is held by the holding device to be used as the backup.

In S108, the motion manager 200 determines whether to use the P-lock system 310 as the backup when the braking devices 312 are used to hold the stopped state of the vehicle 1. The motion manager 200 determines, for example, whether the P-lock system 310 is a control target as the backup based on whether a predetermined second control target flag is ON. The second control target flag is set to ON, for example, when the EPB 314 is not mounted on the vehicle 1. The motion manager 200 may determine, for example, that the P-lock system 310 is the control target as the backup when the first control target flag is OFF and the second control target flag is ON. When determination is made to use the P-lock system 310 as the backup (YES in S108), the process proceeds to S110.

In S110, the motion manager 200 determines whether failure information and control information of the P-lock system 310 are acquired.

The P-lock system 310 includes a control unit (hereinafter referred to as "SBW-ECU") that controls the P-lock system 310. The SBW-ECU determines whether the P-lock system 310 has failed when a predetermined execution condition is satisfied. Since the predetermined execution condition is described above, detailed description thereof will not be repeated. When the SBW-ECU determines that the P-lock system 310 has failed, the SBW-ECU transmits information indicating the failure to the motion manager 200 as the failure information. The failure information may include information indicating a failed part of the P-lock system 310. When the SBW-ECU determines that the P-lock system 310 has no failure, the SBW-ECU transmits information indicating no failure to the motion manager 200 as the failure information.

The SBW-ECU transmits information indicating the control status of the P-lock system 310 to the motion manager 200 as the control information. For example, when the P-lock system 310 holds the stopped state of the vehicle 1, the SBW-ECU transmits information indicating that the vehicle 1 is holding the stopped state by the operation of the P-lock system 310 to the motion manager 200 as the control information. When the stopped state of the vehicle 1 held by the P-lock system 310 is terminated, the SBW-ECU transmits information indicating that the stopped state of the vehicle 1 held by the P-lock system 310 is terminated to the motion manager 200 as the control information. The motion manager 200 determines whether the failure information and the control information of the P-lock system 310 are acquired. The motion manager 200 determines that the failure information and the control information of the P-lock system 310 are acquired when the failure information and the control information have been acquired from the SBW-ECU. When determination is made that the failure information and the control information of the P-lock system 310 are acquired (YES in S110), the process proceeds to S112.

In S112, the motion manager 200 sets a stop holding failure class by using the failure information of the P-lock system 310. For example, the motion manager 200 sets any one of a plurality of predetermined values "00", "01", and "11" as the stop holding failure class as described above.

For example, the motion manager 200 sets the predetermined value "01" as the stop holding failure class when an abnormality has occurred in the P-lock system 310 but failure has not been determined (when the self-diagnosis function has not output a value indicating that the P-lock system 310 has an abnormality). For example, the motion manager 200 sets the predetermined value "01" as the stop holding failure class when the number of times determination is made that the P-lock system 310 has an abnormality is equal to or smaller than a threshold value. For example, the motion manager 200 sets the predetermined value "11" as the stop holding failure class when failure in the P-lock system 310 has been determined (when the self-diagnosis function has output the value indicating that the P-lock system 310 has an abnormality). For example, the motion manager 200 sets the predetermined value "11" as the stop holding failure class when the number of times the P-lock system 310 has an abnormality is larger than the threshold value. The process then proceeds to S114.

In S114, the motion manager 200 sets a stop holding backup state by using the control information of the P-lock system 310. For example, the motion manager 200 sets any one of a plurality of predetermined values "00", "01", "10", and "11" as the stop holding backup state. Since the predetermined values to be set as the stop holding backup state are described above, detailed description thereof will not be repeated.

In S116, the motion manager 200 transmits the stop holding failure class and the stop holding backup state to the ADAS-ECU 10. When the failure information and the control information of the EPB 314 are not acquired (NO in S102), determination is made not to use the P-lock system 310 as the backup (NO in S108), or the failure information and the control information of the P-lock system 310 are not acquired (NO in S110), this process is terminated.

Figure 6:
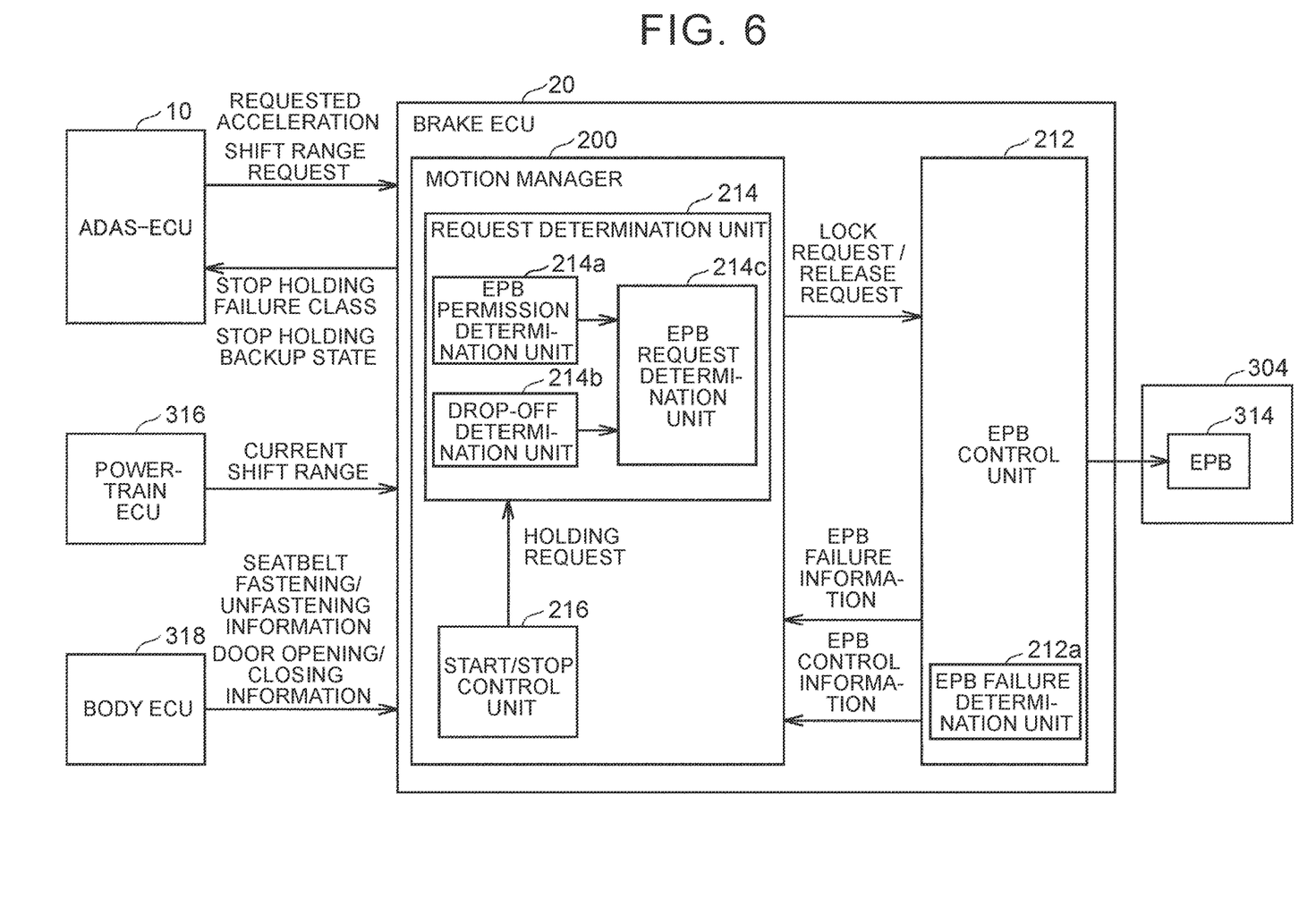
FIG. 6 is a diagram illustrating an example of an operation of the vehicle when the EPB is used as the backup.
Figure 7:
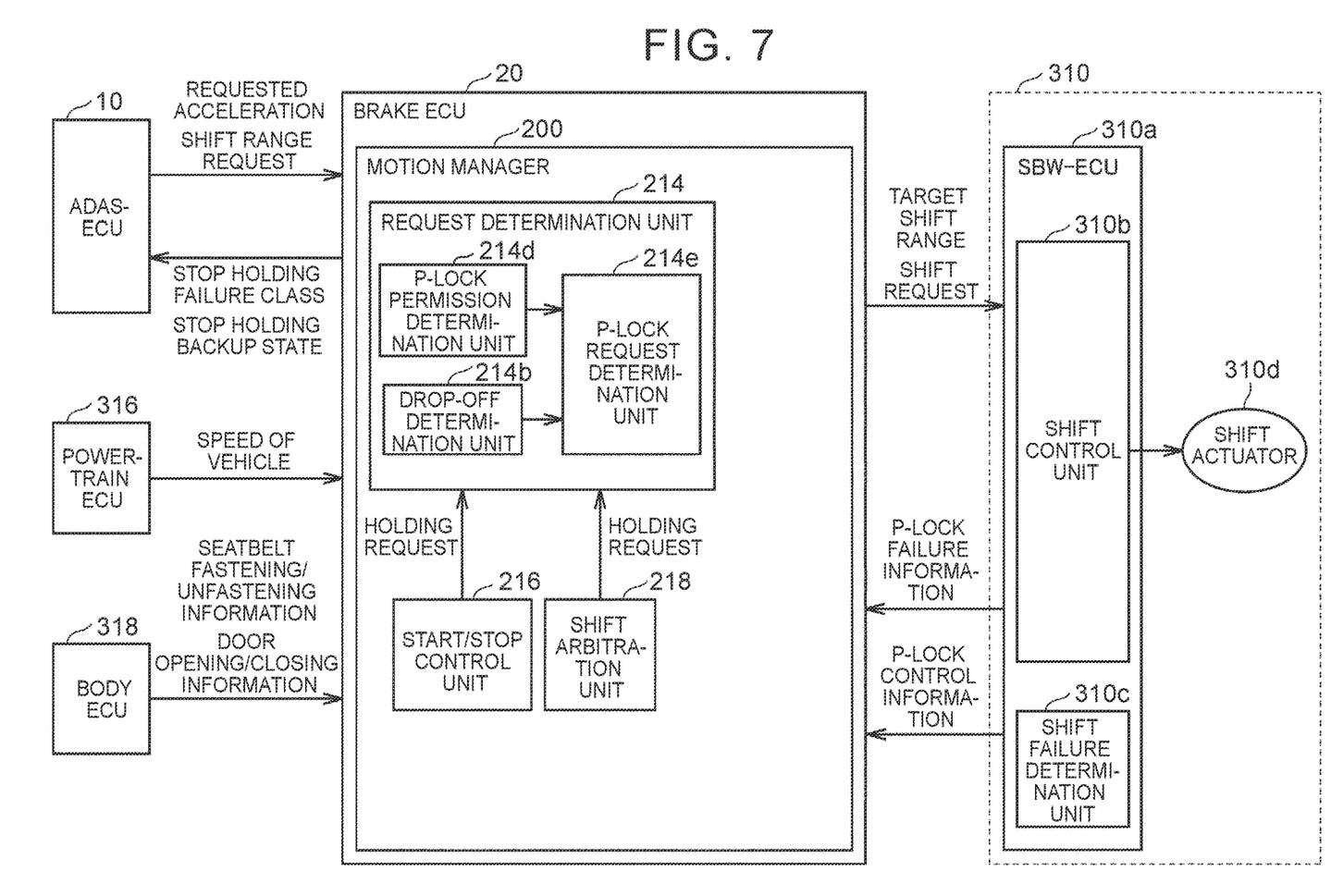
FIG. 7 is a diagram illustrating an example of an operation of the vehicle when the P-lock system is used as the backup.

Examples of operations of the vehicle 1 based on the structure and the flowchart described above will be described with reference to FIGS. 6 and 7. FIG. 6 is a diagram illustrating an example of the operation of the vehicle 1 when the EPB 314 is used as the backup. FIG. 7 is a diagram illustrating an example of the operation of the vehicle 1 when the P-lock system 310 is used as the backup.

Case of Using EPB 314 as Backup

As shown in FIG. 6, for example, when a request to lock the EPB 314 (hereinafter sometimes referred to as "lock request") is received from the motion manager 200, the EPB control unit 212 controls the actuator of the EPB 314 to operate the EPB 314 (restrict the movement of the vehicle 1). When a request to unlock the EPB 314 (hereinafter sometimes referred to as "release request") is received from the motion manager 200, the EPB control unit 212 controls the actuator of the EPB 314 to release the EPB 314 (release the restriction on the movement of the vehicle 1).

The EPB control unit 212 includes an EPB failure determination unit 212a that determines whether the EPB 314 has failed. For example, the EPB failure determination unit 212a may determine that the actuator of the EPB 314 has failed when the voltage of a power supply that supplies electric power to the actuator of the EPB 314 is a high or low voltage outside a predetermined range or a current flowing through the actuator is a large or small current outside a predetermined range. Alternatively, the EPB failure determination unit 212a may determine that the actuator of the EPB 314 has failed when the operation amount of the actuator does not reach a target operation amount or the temperature of the actuator exceeds a threshold value.

The EPB control unit 212 transmits, to the motion manager 200, EPB control information indicating the control status of the EPB 314 (locked or unlocked) and EPB failure information indicating a failure determination result from the EPB failure determination unit 212a.

The motion manager 200 includes a request determination unit 214 that determines which of the locked state and the released state of the EPB 314 to request, and a start/stop control unit 216. The request determination unit 214 includes an EPB permission determination unit 214a, a drop-off determination unit 214b, and an EPB request determination unit 214c.

The EPB permission determination unit 214a determines whether the EPB 314 may be locked. For example, the EPB permission determination unit 214a determines that the EPB 314 may be locked when a current shift range is a parking position. For example, the EPB permission determination unit 214a may acquire information on the current shift range from a powertrain ECU 316 in the powertrain system 302.

The powertrain ECU 316 is connected to a switch or sensor that detects the shift range. The powertrain ECU 316 transmits the information on the current shift range to the motion manager 200 based on a detection result obtained by using the switch or sensor.

The drop-off determination unit 214b determines whether the driver has dropped off the vehicle 1. The drop-off determination unit 214b determines whether the driver has dropped off the vehicle 1 by using seatbelt fastening/unfastening information and door opening/closing information. For example, the drop-off determination unit 214b may determine that the driver has dropped off the vehicle 1 when a seat belt at a driver's seat changes from a fastened state to an unfastened state and a door on the driver's seat side changes from a closed state to an open state and then to the closed state again. The drop-off determination unit 214b acquires the seatbelt fastening/unfastening information and the door opening/closing information from a body ECU 318.

The body ECU 318 is connected to a switch that is turned ON or OFF when the seat belt is fastened or unfastened, and a switch that is turned ON or OFF when the door is opened or closed. The body ECU 318 uses the ON/OFF states of the switches to generate information indicating whether the seat belt is fastened or unfastened and information indicating whether the door is opened or closed, and transmits the pieces of information to the motion manager 200.

The EPB request determination unit 214c determines whether to request lock or release of the EPB 314 by using determination results from the EPB permission determination unit 214a and the drop-off determination unit 214b and a holding request from the start/stop control unit 216. For example, the EPB request determination unit 214c requests the lock of the EPB 314 when the EPB 314 may be locked and determination is made that the driver has dropped off the vehicle, or when the EPB 314 may be locked and the holding request is received. The EPB request determination unit 214c determines to request the release of the EPB 314 when the EPB 314 cannot be locked, determination is made that the driver does not drop off the vehicle, or the holding request is not received.

The start/stop control unit 216 increases the hydraulic pressure for the braking devices 312, for example, when holding the stopped state of the vehicle 1. When the braking devices 312 have an abnormality such as a case where the hydraulic pressure does not increase, the start/stop control unit 216 transmits the holding request for the vehicle 1 using the EPB 314 to the request determination unit 214.

For example, the ADAS-ECU 10 requests a requested acceleration and a shift range based on an operation of any one of the applications.

In such a configuration, when the EPB 314 is used as the backup for the braking devices 312 (YES in S100), the motion manager 200 determines whether failure information and control information of the EPB 314 are acquired (S102).

For example, when EPB control information and EPB failure information indicating that the EPB 314 has failed are received from the EPB control unit 212 (YES in S102), the motion manager 200 sets a stop holding failure class by using the EPB failure information (S104), and sets a stop holding backup state by using the EPB control information (S106). The set stop holding failure class and the set stop holding backup state are transmitted to the ADAS-ECU 10 (S116). The ADAS-ECU 10 determines that an abnormality has occurred in the holding function by receiving the stop holding failure class. For example, the ADAS-ECU 10 may issue an alert or voice notification indicating that the EPB 314 cannot be used as the backup for holding the vehicle 1 in the event of the abnormality in the braking devices 312.

Case of Using P-Lock System 310 as Backup

As shown in FIG. 7, the P-lock system 310 includes an SBW-ECU 310a and a shift actuator 310d.

The SBW-ECU 310a is configured to control the shift actuator 310d. The shift actuator 310d is switched from one of a P-lock operating state and a P-lock released state to the other in response to a control signal from the SBW-ECU 310a. In the P-lock operating state, the P-lock system 310 restricts the rotation of the transmission. In the P-lock released state, the restriction on the rotation of the transmission by the P-lock system 310 is released.

The SBW-ECU 310a includes a shift control unit 310b and a shift failure determination unit 310c.

For example, when a target shift range and a shift request are received from the motion manager 200, the shift control unit 310b controls the shift actuator 310d based on the target shift range. Examples of the shift range in the present embodiment include a parking range (P range), a reverse travel range (R range), a neutral range (N range), and a forward travel range (D range).

For example, when the target shift range is the P range and the shift request is received, the shift control unit 310b controls the shift actuator 310d into the P-lock operating state. For example, when the target shift range is a shift range other than the P range and the shift request is received, the shift control unit 310b controls the shift actuator 310d into the P-lock released state.

The shift failure determination unit 310c determines whether the P-lock system 310 has failed. For example, the shift failure determination unit 310c may determine that the P-lock system 310 has failed when the voltage of a power supply that supplies electric power to the shift actuator 310d is a high or low voltage outside a predetermined range or a current flowing through the shift actuator 310d is a large or small current outside a predetermined range. Alternatively, the shift failure determination unit 310c may determine that the P-lock system 310 has failed when the operation amount of the shift actuator 310d does not reach a target operation amount or the temperature of the shift actuator 310d exceeds a threshold value.

The SBW-ECU 310a transmits, to the motion manager 200, P-lock control information indicating the control status of the P-lock system 310 using the shift control unit 310b (P-lock operating state or P-lock released state) and P-lock failure information indicating a failure determination result from the shift failure determination unit 310c.

The motion manager 200 includes a request determination unit 214 that determines which of the P-lock operating state and the P-lock released state of the P-lock system 310 to request (shift request), a start/stop control unit 216, and a shift arbitration unit 218.

The request determination unit 214 includes a drop-off determination unit 214b, a P-lock permission determination unit 214d, and a P-lock request determination unit 214e. Since the drop-off determination unit 214b is described above, detailed description thereof will not be repeated.

The P-lock permission determination unit 214d determines whether the P-lock system 310 may be brought into the P-lock operating state. For example, the P-lock permission determination unit 214d determines that the P-lock system 310 may be brought into the P-lock operating state when the vehicle 1 is in the stopped state. For example, the P-lock permission determination unit 214d may acquire information on the speed of the vehicle 1 from the powertrain ECU 316.

The powertrain ECU 316 is connected to a sensor that detects the speed of the vehicle 1. The powertrain ECU 316 transmits the information on the speed of the vehicle 1 to the motion manager 200 based on a detection result obtained by using the sensor.

The P-lock request determination unit 214e determines whether to bring the P-lock system 310 into the P-lock operating state or the P-lock released state by using determination results from the drop-off determination unit 214b and the P-lock permission determination unit 214d and a holding request from the start/stop control unit 216 or the shift arbitration unit 218. For example, the P-lock request determination unit 214e transmits the shift request for the P-lock operating state when the P-lock system 310 may be brought into the P-lock operating state and determination is made that the driver has dropped off the vehicle, or when the P-lock system 310 may be brought into the P-lock operating state and the holding request is received. The P-lock request determination unit 214e transmits the shift request for the P-lock released state when the P-lock system 310 cannot be brought into the P-lock operating state, determination is made that the driver does not drop off the vehicle, or the holding request is not received.

The start/stop control unit 216 increases the hydraulic pressure for the braking devices 312, for example, when holding the stopped state of the vehicle 1. When the braking devices 312 have an abnormality, the start/stop control unit 216 transmits the holding request for the vehicle 1 using the P-lock system 310 to the request determination unit 214.

The shift arbitration unit 218 sets a target shift range by using, for example, a request status of the shift range by a shift lever operation. The shift arbitration unit 218 transmits the set target shift range to the SBW-ECU 310a.

In such a configuration, when the P-lock system 310 is used as the backup for the braking devices 312 (NO in S100 and YES in S108), the motion manager 200 determines whether failure information and control information of the P-lock system 310 are acquired (S110).

For example, when control information of the P-lock system 310 and P-lock failure information indicating that the P-lock system 310 has failed are received from the SBW-ECU 310a (YES in S110), the motion manager 200 sets a stop holding failure class by using the failure information of the P-lock system 310 (S112), and sets a stop holding backup state by using the control information of the P-lock system 310 (S114). The set stop holding failure class and the set stop holding backup state are transmitted to the ADAS-ECU 10 (S116). The ADAS-ECU 10 determines that an abnormality has occurred in the holding function by receiving the stop holding failure class. For example, the ADAS-ECU 10 may issue an alert or voice notification indicating that the P-lock system 310 cannot be used as the backup for holding the vehicle 1 in the event of the abnormality in the braking devices 312.

As described above, according to the motion manager 200 of the present embodiment, the predetermined information transmitted to the ADAS-ECU 10 includes the stop holding failure class (corresponding to the first information) and the stop holding backup state (second information), and does not include information for identifying the category of the holding device to be used as the backup. Therefore, the ADAS-ECU 10 can grasp the control status and whether the holding device to be used as the backup has an abnormality based on the first information and the second information even if the category of the holding device is different. Therefore, when there are variations in the holding device to be used as the backup, it is not necessary to set the control information and the failure information depending on the category of the holding device. Thus, it is possible to reduce the occurrence of the design burden due to the increase in the number of categories of holding device to be used as the backup. Accordingly, it is possible to provide the motion manager, the vehicle, the control method for the vehicle, and the program that reduce the occurrence of the design burden due to the increase in the number of categories of holding device to be used as the backup for holding the stop of the vehicle.

Modifications will be described below.

In the embodiment described above, description has been given of the exemplary configuration in which the motion manager 200 includes the reception unit 202, the arbitration unit 204, the calculation unit 206, the distribution unit 208, and the transmission unit 210. For example, the motion manager 200 may include a first motion manager that at least receives kinematic plans from the applications, and a second motion manager that can communicate with the first motion manager and requests a motion from the actuator system 30. In this case, the function of the arbitration unit 204, the function of the calculation unit 206, the function of the distribution unit 208, and the function of the transmission unit 210 may be implemented in either the first motion manager or the second motion manager.

In the embodiment described above, description has been given of the case where the EPB 314 or the P-lock system 310 is used as the backup for the braking devices 312. At least one of the EPB 314 and the P-lock system 310 may be used as the backup for the braking devices 312.

For example, when the EPB 314 is used as the backup for the braking devices 312 and determination is made that the EPB 314 has failed, the P-lock system 310 may be used as the backup for the braking devices 312.

In the embodiment described above, description has been given of the exemplary case where the P-lock system 310 and the EPB 314 are mounted on the vehicle 1 for convenience of description, but it is only necessary that at least one of the P-lock system 310 and the EPB 314 is mounted. For example, the P-lock system 310 may be omitted from the vehicle 1, or the EPB 314 may be omitted instead.

A part or all of the above modifications may be combined as appropriate.

The embodiment disclosed herein should be construed as illustrative in all respects and not restrictive. The scope of the present disclosure is shown by the claims rather than by the above description and is intended to include all modifications within the meaning and scope equivalent to the claims.

What is claimed is:

1. A motion manager configured to request at least one of a plurality of actuators provided in a vehicle to move the vehicle in accordance with a kinematic plan related to driver assistance for the vehicle, the driver assistance including assistance using a holding function to hold a stopped state of the vehicle, the kinematic plan being set by a setting device configured to transmit information to and receive information from the motion manager, the actuators including a first holding device and a second holding device, the first holding device having the holding function, the second holding device having the holding function and being configured to execute backup control for holding the stopped state of the vehicle when the first holding device has an abnormality, the motion manager comprising one or more processors configured to:
   receive information indicating the kinematic plan from the setting device;
   distribute, to at least one of the actuators, a motion request for the vehicle that is calculated by using the kinematic plan; and
   transmit predetermined information to the setting device, the predetermined information including first information indicating whether an abnormality has occurred in the holding function of the second holding device, and second information indicating a control status of the second holding device, and the predetermined information not including information for identifying a category of the second holding device.

2. The motion manager according to claim 1, wherein the first holding device includes a service brake, and the second holding device includes a parking lock system or an electric parking brake system.

3. A vehicle comprising:
   a setting device configured to set a kinematic plan related to driver assistance for the vehicle;
   a plurality of actuators including a first holding device and a second holding device, the first holding device having a holding function to hold a stopped state of the vehicle, the second holding device having the holding function and being configured to execute backup control for holding the stopped state of the vehicle when the first holding device has an abnormality; and
   a motion manager configured to transmit information to and receive information from the setting device, and request at least one of the actuators to move the vehicle in accordance with the kinematic plan,
   the driver assistance including assistance using the holding function,
   the motion manager being configured to transmit predetermined information to the setting device,
   the predetermined information including first information indicating whether an abnormality has occurred in the holding function of the second holding device, and second information indicating a control status of the second holding device, and
   the predetermined information not including information for identifying a category of the second holding device.

4. A control method for a vehicle to be performed by a computer mounted on the vehicle, the vehicle including a setting device configured to set a kinematic plan related to driver assistance for the vehicle, and a plurality of actuators including a first holding device and a second holding device, the first holding device having a holding function to hold a stopped state of the vehicle, the second holding device having the holding function and being configured to execute backup control for holding the stopped state of the vehicle when the first holding device has an abnormality, the driver assistance including assistance using the holding function, the control method comprising:
   setting a kinematic plan related to the driver assistance by using the setting device;
   receiving information indicating the kinematic plan from the setting device;
   distributing, to at least one of the actuators, a motion request for the vehicle that is calculated by using the kinematic plan; and
   transmitting predetermined information to the setting device, the predetermined information including first information indicating whether an abnormality has occurred in the holding function of the second holding device, and second information indicating a control status of the second holding device, and the predetermined information not including information for identifying a category of the second holding device.

5. A non-transitory storage medium storing instructions that are executable by a computer mounted on a vehicle and that cause the computer to perform the control method according to claim 4.

* * * * *